(12) United States Patent
Dehmoubed

(10) Patent No.: US 8,229,511 B2
(45) Date of Patent: Jul. 24, 2012

(54) ELECTRONIC DEVICE INCLUDING TOUCH-SENSITIVE DISPLAY

(75) Inventor: Farzin Dehmoubed, Woodbridge (CA)

(73) Assignee: Research In Motion Limited, Waterloo (CA)

(*) Notice: Subject to any disclaimer, the term of this patent is extended or adjusted under 35 U.S.C. 154(b) by 219 days.

(21) Appl. No.: 12/854,639

(22) Filed: Aug. 11, 2010

(65) Prior Publication Data

US 2012/0040722 A1 Feb. 16, 2012

(51) Int. Cl.
*H04M 1/00* (2006.01)
*H04B 1/38* (2006.01)
(52) U.S. Cl. ............... 455/566; 455/575.1; 345/173
(58) Field of Classification Search .................... None
See application file for complete search history.

(56) References Cited

U.S. PATENT DOCUMENTS

| | | | |
|---|---|---|---|
| 5,640,296 A | 6/1997 | Bonsall et al. | |
| 6,389,301 B1 * | 5/2002 | Furuya | 455/566 |
| 8,082,523 B2 * | 12/2011 | Forstall et al. | 715/863 |
| 2008/0163082 A1 * | 7/2008 | Rytivaara | 715/762 |
| 2009/0046068 A1 | 2/2009 | Griffin | |
| 2009/0167722 A1 | 7/2009 | Villain | |
| 2010/0125811 A1 * | 5/2010 | Moore et al. | 715/846 |
| 2010/0156844 A1 | 6/2010 | Paleczny et al. | |

FOREIGN PATENT DOCUMENTS

| | | |
|---|---|---|
| GB | 2402105 A | 12/2004 |
| JP | 2000200141 A | 7/2000 |
| WO | 2008151863 A1 | 12/2008 |

OTHER PUBLICATIONS

Extended European Search Report dated Dec. 20, 2010, issued from the corresponding European patent application.

* cited by examiner

*Primary Examiner* — Ajit Patel
(74) *Attorney, Agent, or Firm* — Geoffrey deKleine; Borden Ladner Gervais LLP

(57) ABSTRACT

An electronic device includes a housing, a touch-sensitive display exposed by the housing, a support tray disposed between the touch-sensitive display and a base within the housing and supporting the touch-sensitive display on a first side thereof, the support tray including at least one pivot projecting from a second side of support tray, on which the support tray is pivotable, and an actuator disposed between the base and the support tray and actuatable by pivoting the support tray.

17 Claims, 5 Drawing Sheets

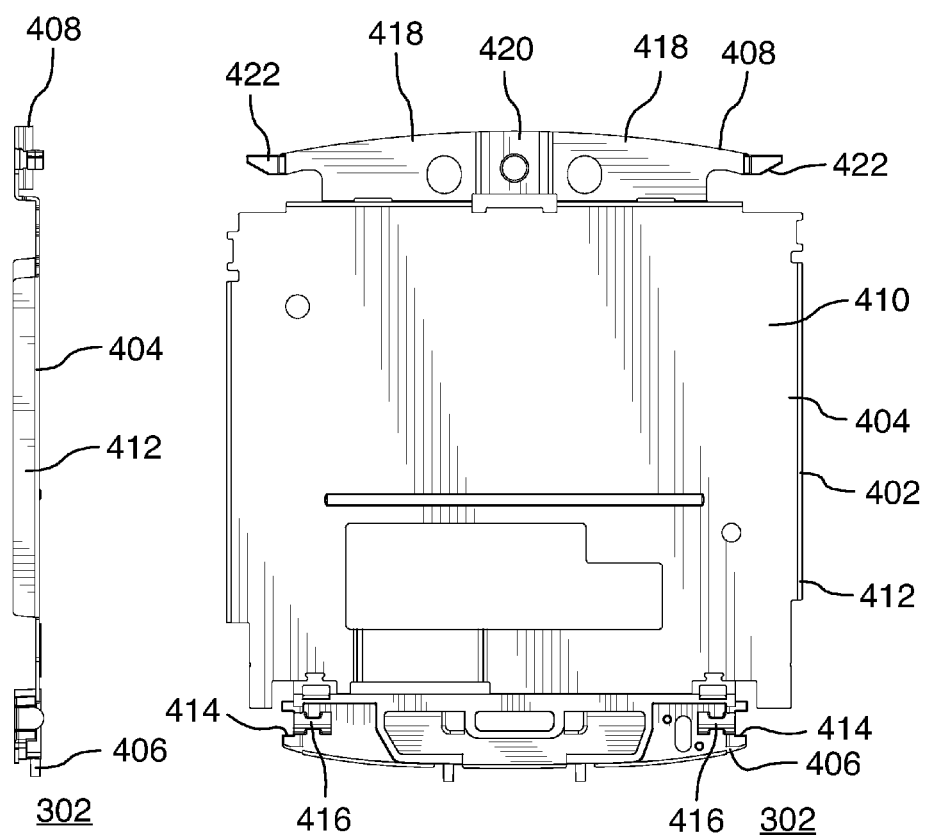

ELECTRONIC DEVICE INCLUDING TOUCH-SENSITIVE DISPLAY

FIELD OF TECHNOLOGY

The present disclosure relates to an electronic device including a touch-sensitive display and an actuator to provide feedback.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

Tactile feedback for such touch-sensitive input devices provides a positive confirmation of, for example, touch selection. The provision and control of tactile feedback in touch-sensitive devices is desirable.

BRIEF DESCRIPTION OF THE DRAWINGS

Embodiments of the present disclosure will now be described, by way of example only, with reference to the attached Figures, wherein:

FIG. 6 is a top view of the support tray of the portable electronic device of FIG. 2; and FIG. 7 is side view of the support tray of the portable electronic device of FIG. 2.

DETAILED DESCRIPTION

Figure 1:
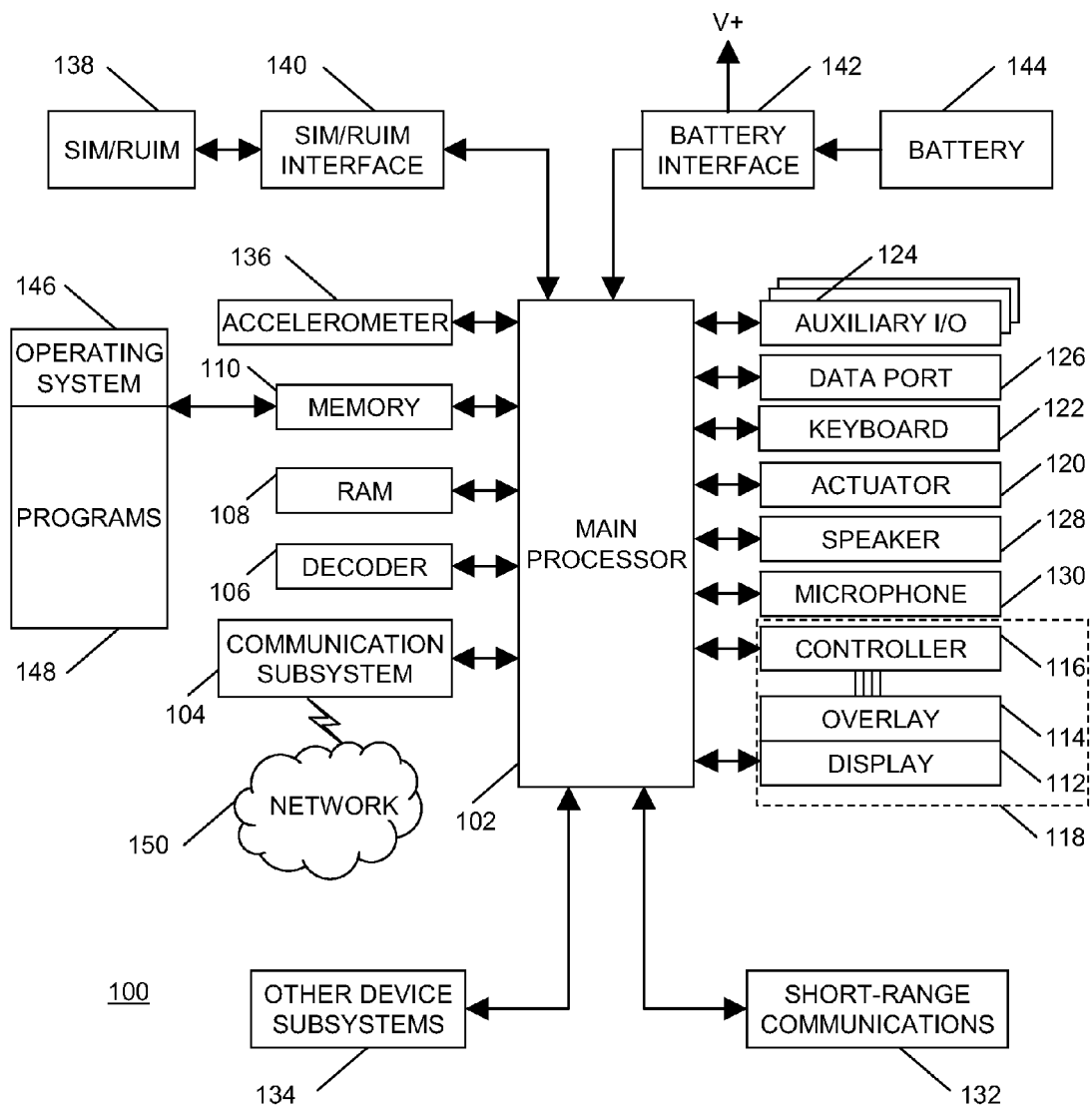
FIG. 1 is a simplified block diagram of components including internal components of a portable electronic device according to an example embodiment.

The following describes electronic device includes a housing, a touch-sensitive display exposed by the housing, a support tray disposed between the touch-sensitive display and a base within the housing and supporting the touch-sensitive display on a first side thereof, the support tray including at least one pivot projecting from a second side of support tray, on which the support tray is pivotable, and an actuator disposed between the base and the support tray and actuatable by pivoting the support tray.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Utilizing a support tray that is pivotable on a pivot extending from one side, and an actuator that is actuatable by pivoting of the support tray, tactile feedback is provided upon depression of the touch-sensitive display. The pivotable support tray is constrained within the housing and constrains the touch-sensitive display to control movement of the touch-sensitive display, facilitating improved sealing and providing desirable tactile feedback.

FIG. 1 shows a simplified block diagram of components including internal components of an electronic device according to an example embodiment. Although the electronic device in the example embodiments herein describe a portable electronic device, other electronic devices are contemplated. The portable electronic device in the present example 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator 120, a keyboard 122, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 is electronically connected and interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
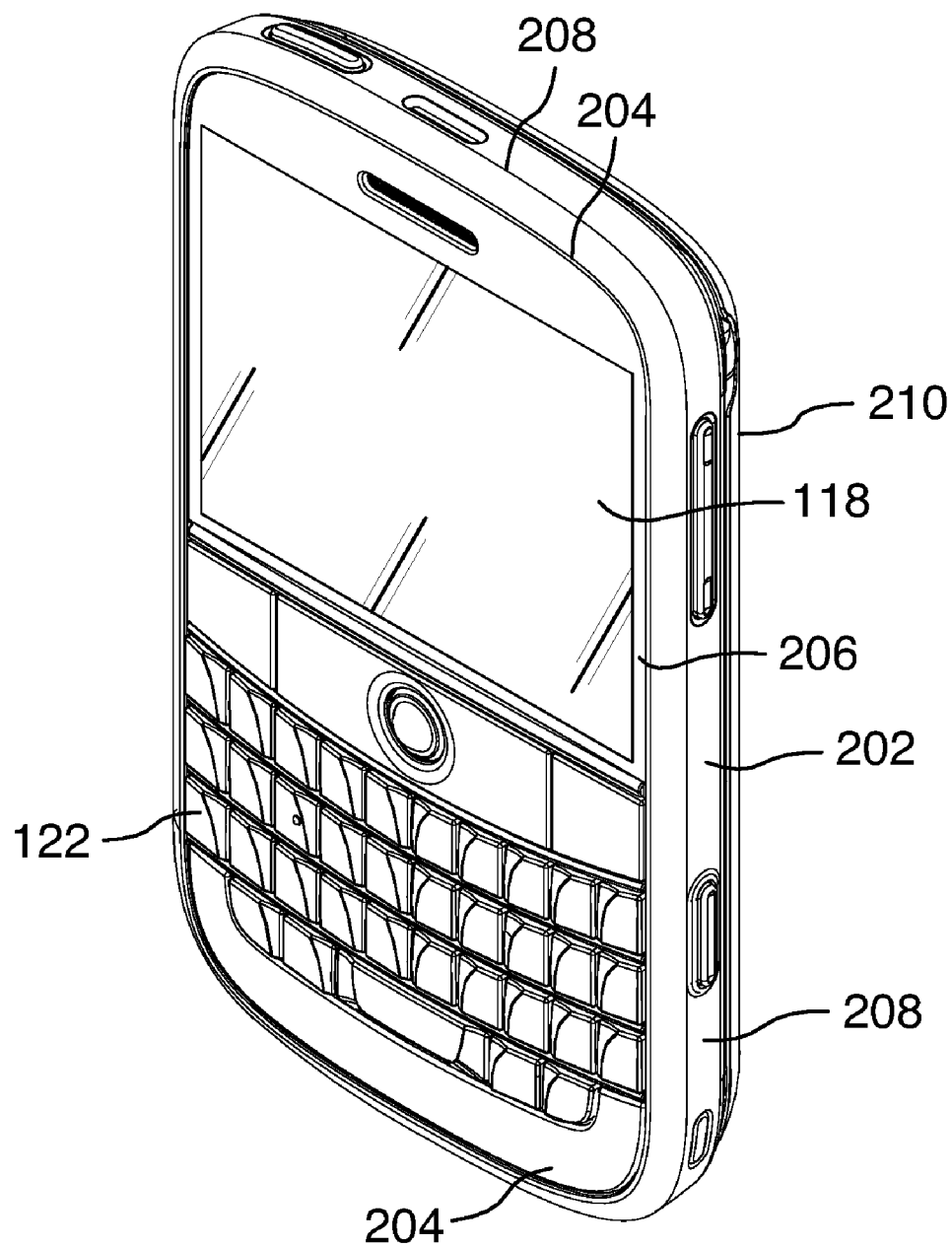
FIG. 2 is a perspective view of an example of a portable electronic device.

FIG. 2 is a perspective view of an example of a portable electronic device 100. The portable electronic device 100 includes a housing 202 that is suitable for housing the internal components shown in FIG. 1. The housing 202 includes a front 204 with a frame 206 that frames the touch-sensitive display 118 for user-interaction with the touch-sensitive display 118, sidewalls 208, and a back 210. The touch-sensitive display 118 is available for user interaction through the opening defined the by frame 206 in the front 204 of the housing 202. The portable electronic device 100 of FIG. 2 also includes a physical keyboard 122 such that the processor 102 (shown in FIG. 1) interacts with the keyboard 122 and the housing 202 is constructed to accommodate the keys of the keyboard 122. The housing 202 houses internal components of the portable electronic device 100, including the internal components that are shown in FIG. 1 and described above.

Figure 3:
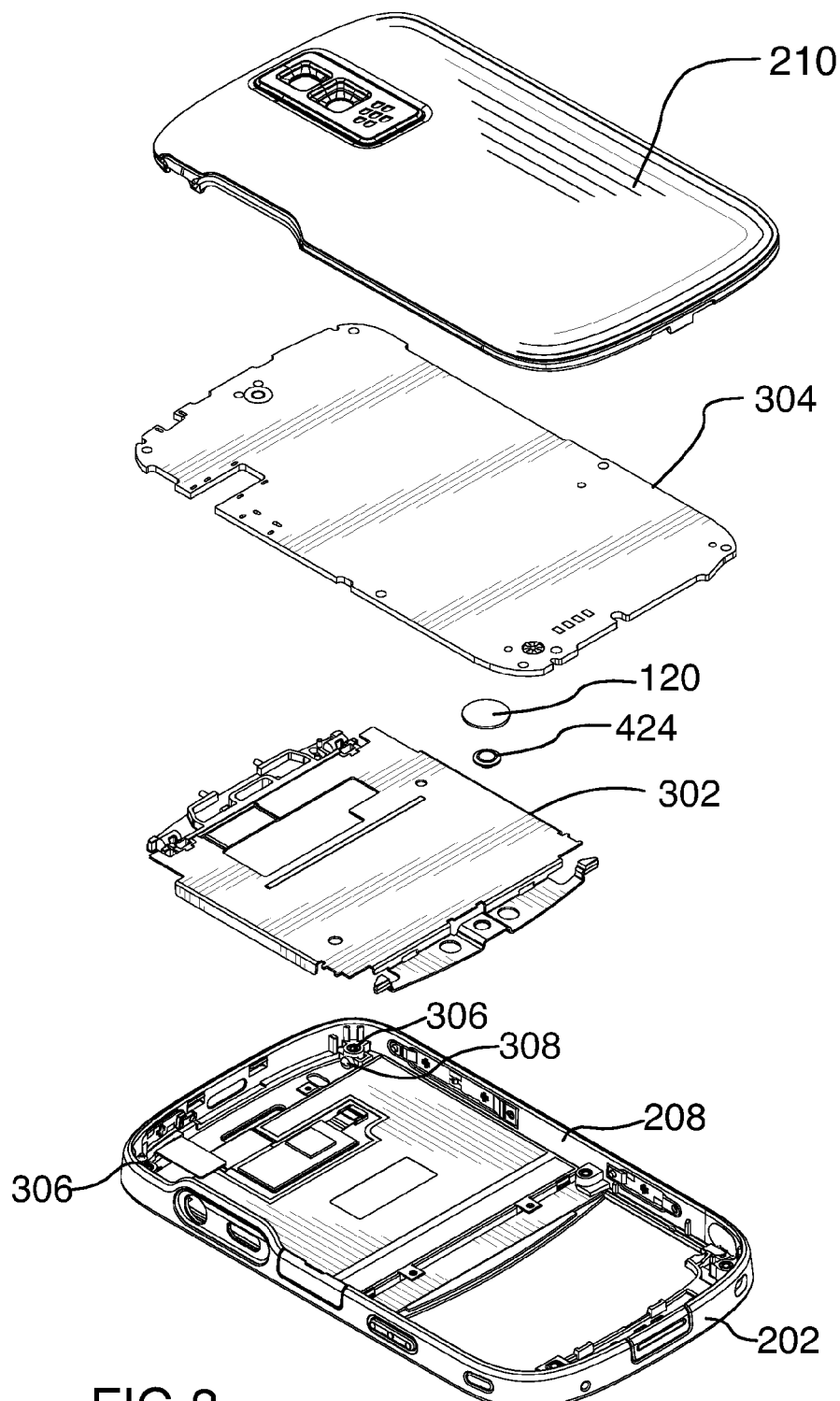
FIG. 3 is an exploded view of portions of the portable electronic device of FIG. 2, in accordance with an example embodiment.
Figure 4:
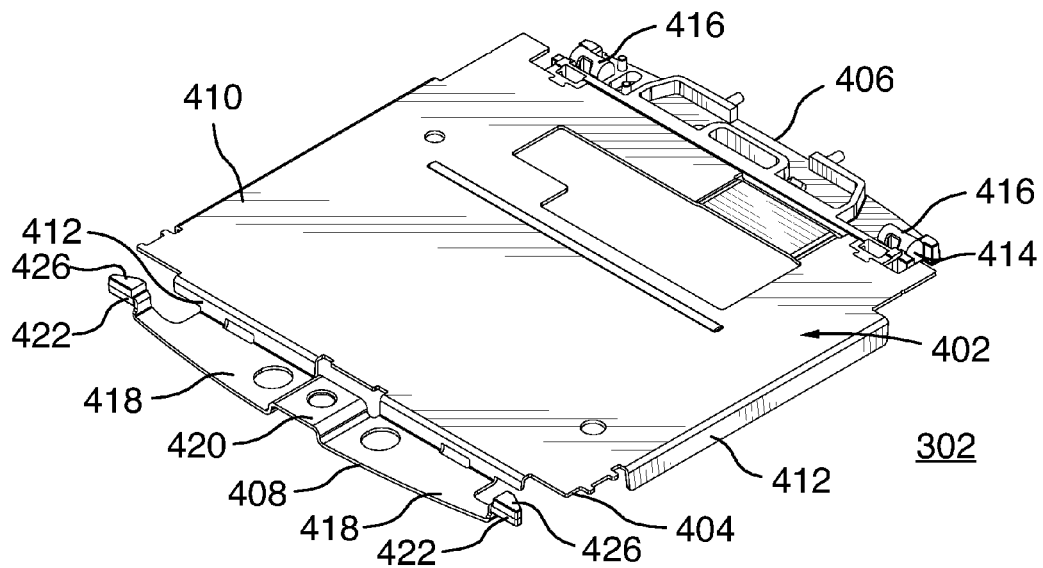
FIG. 4 is a rear perspective view of a support tray of the portable electronic device of FIG. 2.
Figure 5:
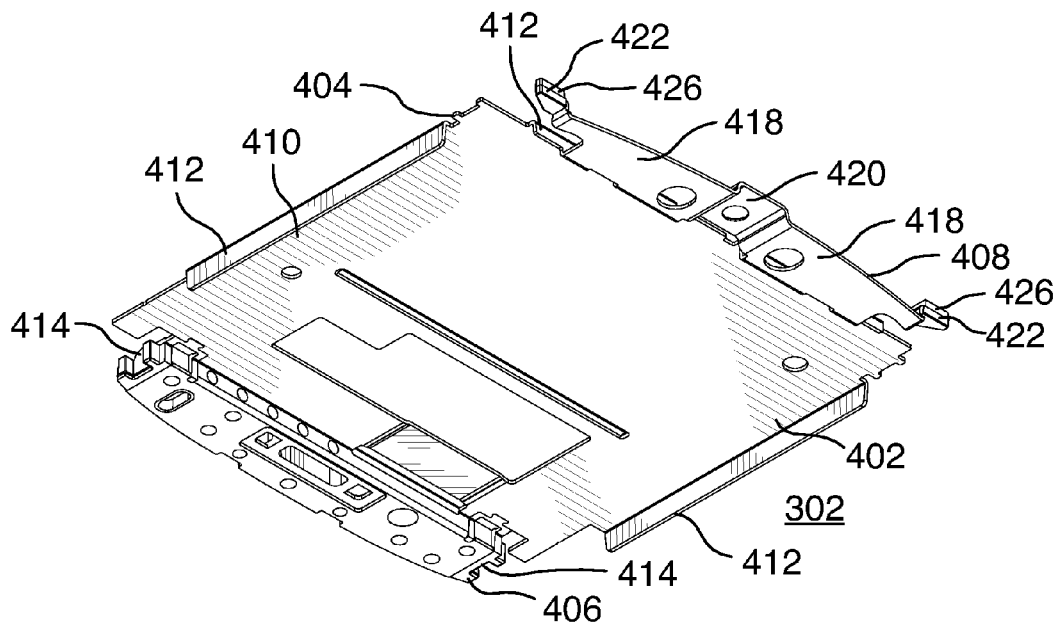
FIG. 5 is a front perspective view of the support tray of the portable electronic device of FIG. 2.

FIG. 3 is a rear exploded view of parts of the portable electronic device 100 with the touch-sensitive display 118 facing down. The touch-sensitive display 118 is supported on a support tray 302, shown above the touch-sensitive display 118 in the exploded view of FIG. 3. A base 304, which in the present example is a printed circuit board, is disposed between the support tray 302 and the back 210 of the portable electronic device 100.

In the example of FIG. 3, the housing 202 includes screw bosses 306 that are integrally molded into the housing 202 to connect the back 210, utilizing suitable screws that extend through the base 304 and into the screw bosses 306. The screw bosses 306 may be located at any suitable location and, in the example shown, screw bosses 306 are disposed near respective corners of the housing 202. The base 304 is thereby fixed within the housing 202 and may be spaced from the back 210 by suitable spacers that form part of the back 210 or are inserted between the back 210 and the base 304.

A pair of guides 308, that include generally spherical ends, protrude inwardly from the screw bosses 306 at the top corners of the housing 202, toward a centerline of the housing 202. The guides 308 may also be integrally molded into the housing 202. The guides 308 extend inwardly to cooperate with notches in the support tray 302 to constrain and inhibit lateral movement while facilitating pivotal movement of the support tray 302. A rounded protuberance 424 is coupled to the support tray 302 to act as an abutment surface to actuate the actuator 120. The rounded protuberance 424 includes a back that mates with an aperture in a lower end of the support tray 302

Referring now to FIG. 4, FIG. 5, FIG. 6, and FIG. 7, the support tray 302 includes a body 402 that includes a central portion 404, an upper portion 406, and a lower portion 408. For the purposes of providing a reference, the terms upper and lower as used herein refer to the relative position of features when the portable electronic device is held in the upright position based on the orientation of the keyboard 122. The body 402 may be made of, for example, stamped sheet metal. The central portion 404 includes a generally flat plate 410 on one side of which the touch-sensitive display 118 which is supported. The plate 410 includes slots and cut-out sections to accommodate electrical connections to the touch-sensitive display 118. Sidewalls 412 extend generally perpendicularly from each of four edges of the plate 410, including a top and bottom end of the plate 410. The sidewalls 412 extend perpendicularly from the plate 410 to protect the edges of the touch-sensitive display 118 supported on a first side of the support tray 302.

The upper portion 404 extends from a sidewall 412 at a top of the plate 410 and the lower portion 404 extends from a sidewall 412 at a bottom of the plate 410. The upper portion 404 includes a portion of the stamped metal plate, which is generally flat and is overmolded with plastic to accommodate, for example, connection of the speaker 128 (shown in FIG. 1) and couplings for the auxiliary I/O (shown in FIG. 1). The upper portion 404, including the overmolded plastic, includes C-shaped notches 414 with a respective one of the notches 414 at each side edge of the upper portion 406. The notches 414 are sized and shaped to cooperate with the guides 308 such that the guides 308 are received in the notches 414 and inhibit lateral movement of the upper portion 406, thereby inhibiting lateral movement of the support tray 302. The edges of the upper portion are defined by the sidewall 412 at the top of the plate 410, the C-shaped notches 414 and a generally curved edge opposite the sidewall 412.

The upper portion 404 also includes pivots 416 with a respective one of the pivots 416 adjacent each of the C-shaped notches 414. The pivots 416 are therefore near an upper end of the support tray 302 and extend from an opposite side of the support tray 302 as the touch-sensitive display 118. In the example shown in FIG. 4 and FIG. 5, the pivots 416 are generally semi-cylindrically shaped and are formed of the overmolded plastic. The pivots 416 extend from the upper portion 404 at a second side of the support tray 302 and extend a distance that is greater than the distance that the sidewalls 412 extend from the plate 410 such that the pivots 416 abut the base 304 to facilitate pivoting of the support tray 302 about the pivots 416, relative to the base 304.

The lower portion 408 extends from a sidewall 412 at a bottom of the plate 410 and includes two generally flat lengths 418 that are joined at a stepped center 420 such that the center is stepped closer to the base 304 than the flat lengths 418. The stepped center 420 includes an aperture therein to receive the rounded protuberance 424 (shown in FIG. 3). The rounded protuberance 424, and the actuator 120, are therefore near a lower end of the support tray 302, which is opposite the upper end of the support tray 302.

A respective foot 422 extends from the end of each of the generally flat lengths 418. The feet 422 extend in the direction of the base 304 to limit movement or bending of the support tray 302 and the touch-sensitive display 118 during and after actuation of the actuator 120 (FIG. 1).

Suitable biasing elements may be utilized to bias the touch-sensitive display 118 toward the frame 206 of the housing 202, into a position in which the actuator 120 (shown in FIG. 1) is not actuated. For example, the feet 422 may each include biasing elements 426 that bias the feet 422 away from the base 304.

In the example shown in the figures, the support tray 302 is not fastened to the housing 202. Instead, the support tray 302 is pivotable and constrained within the housing 202 by the base 304, the guides 308, and the frame 206 of the housing 202.

As indicated above, the touch-sensitive display 118 is available for user interaction through the opening defined the by frame 206 in the front 204 of the housing 202. Pads, such as gel pads, may be disposed between the touch-sensitive display 118 and the backside of the frame 206 to bias the touch-sensitive display 118, to provide a seal around the touch-sensitive display 118, and/or to improve tactile feel for the user. The constrained touch-sensitive display 118 provides controlled movement and facilitates sealing of the touch-sensitive display 118 utilizing, for example, the gel pads.

The actuator 120 may be any suitable actuator. For example, the actuator 120 may be a mechanical actuator such as a dome switch that is actuated by imparting a force to depress the switch and is returned to the unactuated state, referred to as released, when the imparted force is removed. The actuator 120 is depressed by applying sufficient force to the touch-sensitive display 118 to overcome the actuation force of the actuator 120. The actuator 120 may be actuated by pressing anywhere on the touch-sensitive display 118, causing pivoting of the touch-sensitive display 118, about the pivot axis defined by the pivots 416. The actuator 120 provides additional input to the processor 102 as an electrical signal is sent to the processor upon actuation and/or when the actuator is released. The actuator also provides desirable tactile feedback through the support tray 302 and touch-sensitive display 118 such that tactile feedback is provided upon actuation and upon release.

The actuator 120 may be utilized to provide confirmation of selection of a feature on the touch-sensitive display 118. For example, a touch at a position on the touch-sensitive display 118, that is associated with a selectable feature, may result in display of an indicator at the selectable feature. Selection of the feature to perform an associated function is achieved when the touch-sensitive display is depressed and the actuator 120 is actuated.

Utilizing a support tray that is pivotable on a pivot that extends from one side of the support tray, and an actuator that is actuatable by pivoting of the support tray, tactile feedback is provided upon depression of the touch-sensitive display. The tactile feedback confirms receipt of input to the user. The tactile feedback provides a positive response and reduces the chance of input errors such as double entry, decreasing use time and increasing user-satisfaction. The pivotable support tray is constrained within the housing and constrains the touch-sensitive display. The constrained touch-sensitive display provides controlled movement, facilitating improved sealing of the touch-sensitive display with the housing, reducing ingress of, for example, dust, and improving tactile feedback.

According to one aspect, an electronic device includes a housing, a touch-sensitive display exposed by the housing, a support tray disposed between the touch-sensitive display and a base within the housing and supporting the touch-sensitive display on a first side thereof, the support tray including at least one pivot projecting from a second side of support tray, on which the support tray is pivotable, and an actuator disposed between the base and the support tray and actuatable by pivoting the support tray.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. An electronic device comprising:
   a housing;
   a touch-sensitive display exposed by the housing;
   a support tray disposed between the touch-sensitive display and a base within the housing and supporting the touch-sensitive display on a first side thereof, the support tray including at least one pivot projecting from a second side of support tray, on which the support tray is pivotable; and
   an actuator disposed between the base and the support tray and actuatable by pivoting the support tray.

2. The electronic device according to claim 1, wherein the at least one pivot is located near a first end of the support tray.

3. The electronic device according to claim 2, wherein the actuator is located near a second end of the support tray.

4. The electronic device according to claim 1, wherein the at least one pivot comprises a pair of spaced apart pivots projecting from the second side of the support tray the second side opposite the first side.

5. The electronic device according to claim 1, wherein the base comprises a printed circuit board.

6. The electronic device according to claim 1, wherein the extent of movement of the second end during pivoting is constrained by the base.

7. The electronic device according to claim 1, wherein the support plate includes a C-shaped notch at each of two opposing side edges of the support tray.

8. The electronic device according to claim 7, wherein the notches are near a first end of the support tray.

9. The electronic device according to claim 7, comprising guides projecting inwardly within the housing and received in the notches of the support tray.

10. The electronic device according to claim 9, wherein the guides comprise semi-spherical ends that are received in the notches of the support tray.

11. The electronic device according to claim 9, wherein the support tray pivots around the guides.

12. The electronic device according to claim 9, wherein the guides constrain the support tray to inhibit lateral movement of the touch-sensitive display.

13. The electronic device according to claim 9, wherein the guides project inwardly from a portion of the housing.

14. The electronic device according to claim 9, wherein the guides project inwardly from screw bosses near respective corners of the housing.

15. The electronic device according to claim 9, wherein the guides are integrally formed with the housing.

16. The electronic device according to claim 1, wherein the actuator comprises a dome switch.

17. The electronic device according to claim 1, comprising a processor electronically coupled to the touch-sensitive display.

* * * * *